United States Patent Office 3,494,194
Patented Feb. 10, 1970

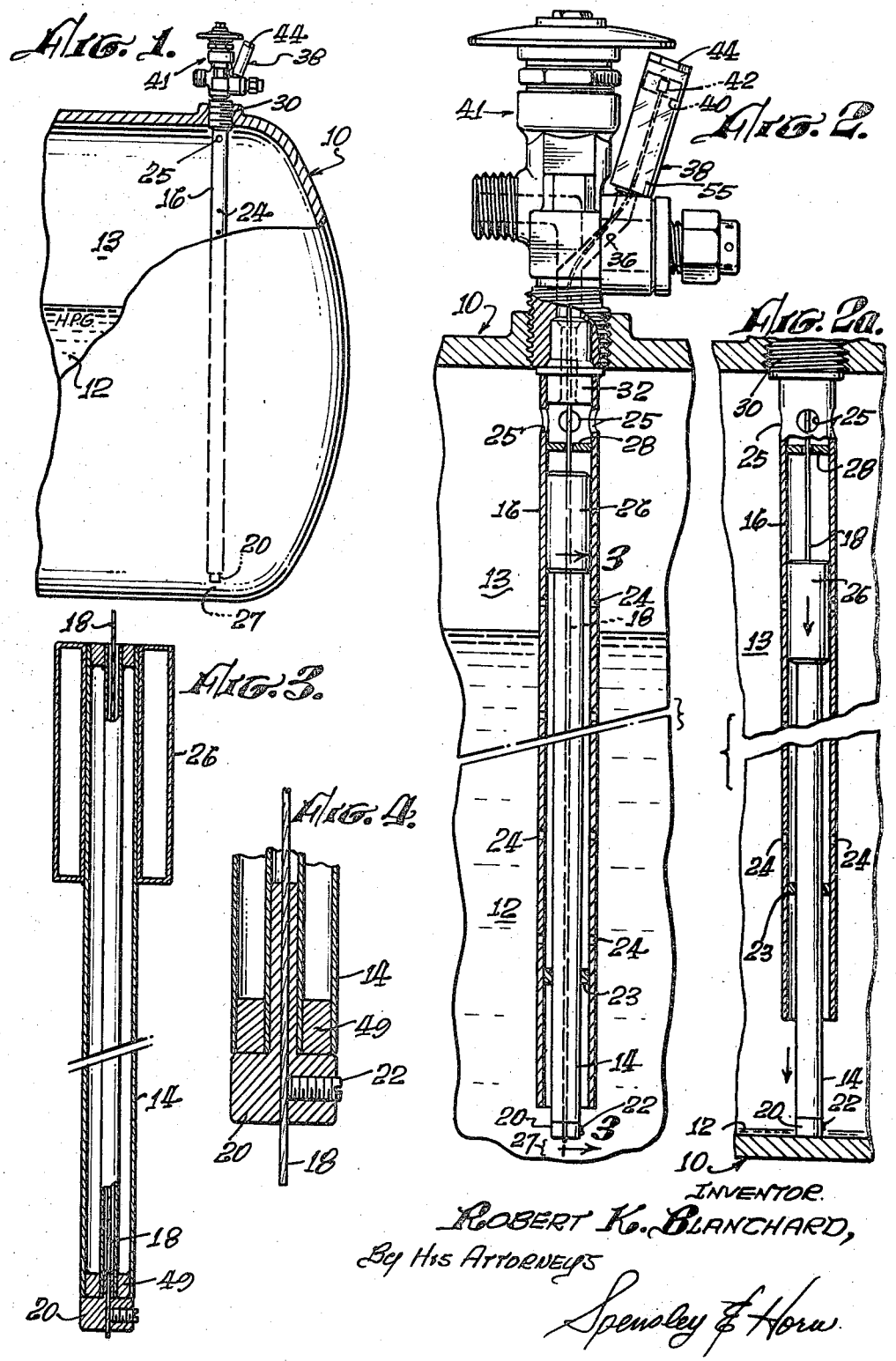

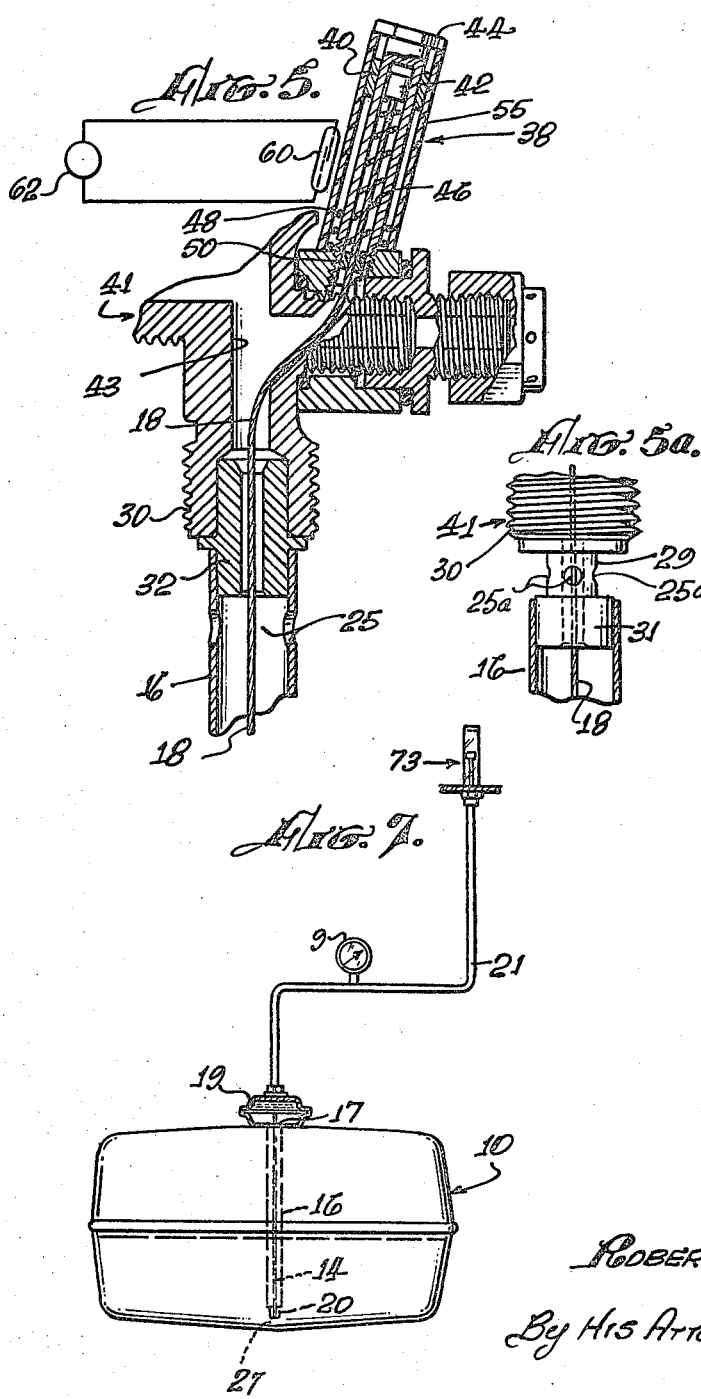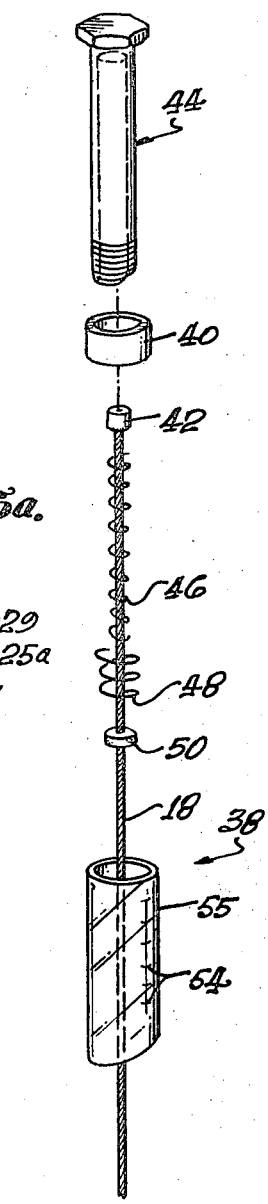

3,494,194
FLUID QUANTITY MEASURING DEVICE
Robert K. Blanchard, 4035 Royal Oaks Place,
Encino, Calif. 91316
Filed Oct. 23, 1967, Ser. No. 677,184
Int. Cl. G01f 23/10
U.S. Cl. 73—308                                  5 Claims

ABSTRACT OF THE DISCLOSURE

A fluid quantity measuring device including an elongated rod which has an enlarged cross-section at the top, the rod being vertically disposed within a container and extending to the bottom thereof, the enlarged cross-sectioned portion of the rod being in the gaseous phase of the fluid. The rod will move slightly vertically as the quantity of the fluid within the container changes. This movement is due to an increase or decrease in buoyancy exerted on the rod by the fluid. The read-out device is calibrated so that for any position of an indicator a known quantity of fluid remains within the container.

BACKGROUND OF THE INVENTION

Field of the invention

This invention relates to an apparatus for measuring the quantity of a liquid in a closed or open container, and more particularly relates to an apparatus for transmitting the slight vertical movement of an immersed weight due to changes in buoyancy to a read-out device.

Description of the prior art

One of the conventional prior art methods for measuring the quantity of a liquid in a closed cylinder is the float and linkage apparatus; that is a float and its link system are provided inside a closed container in such a manner that as the liquid level changes, the float moves vertically upward or downward. The link system then transmits this movement to an indicating system outside the cylinder such as a liquid volume indicator. The liquid volume indicator indicates the volume of liquid in correspondence with the vertical movement of the float. The problem with this method is that the liquid level is indicated but this does not always indicate the correct quantity or weight of a fluid such as a liquified gas. Even in the same liquified gas the liquid level does not always give the correct liquid weight because of the change of specific gravity due to the change of temperature. Thus, although it is possible to ascertain the volume of liquid in the container, it is impossible by this method to ascertain the true weight or quantity of fluid remaining. That is, some of the fluid will be in the liquid state and some in the gaseous state and the ratio of one to the other may change as by a temperature change without any necessary change in the total weight of fluid within the container. Furthermore, in the case of a large container, the link system provided is of necessity very cumbersome and large, and is inherently inaccurate. When the fluid within the container is a liquified gas having a liquid phase and a gas phase the float method does not account for the vapor phase or liquid density within the cylinder, only the volume of liquid is measured. Other methods available are also cumbersome and these include first weighing an empty cylinder and then weighing the cylinder having a liquid in it, and obtaining the difference in weight which is the weight of liquid. Finally, it is possible to meter the amount of gas used and then by a series of calculations to calculate the quantity of remaining gas or liquid within the cylinder. All the above methods are difficult and time consuming to use and are inherently inaccurate.

Accordingly, one of the objects of the present invention is to provide an improved fluid quantity measuring apparatus which is dependent upon the buoyant effect of fluid upon an immersed object.

Another object of the present invention is to provide a fluid quantity measuring apparatus which measures both the amount of liquid phase and vapor phase within a closed pressurized container.

Yet another object of the present invention is to provide a fluid quantity measuring device having a rod of a known volume which is adapted to respond to the buoyant effects of a liquid phase in a container as well as to the gas phase of the fluid therein and which weight increase or weight loss is translated into a vertical motion of the rod which motion in turn is transmitted to a read-out device situated exteriorly of the container.

SUMMARY OF THE INVENTION

In one of its broadest aspects the invention comprises a fluid quantity measuring device comprising: An elongated rod vertically disposed within a container and being positioned at the bottom of an empty container, the rod being adapted to reproducibly respond to the buoyant force of a fluid within the container at all levels of fluid within the container. Biasing means are provided and are connected to the rod and to a liquid level indicating means. The biasing means transmits, to the indicating means, weight changes of the immersed rod due to buoyancy effects. Also provided is a fluid level indicating means which is operatively connected to the biasing means.

One of the advantages of the invented apparatus is that it is possible to measure with extreme accuracy the amount of a fluid in a closed pressurized cylinder. The present invention provides means to measure the weight of a liquified gas in a pressurized gas cylinder wherein part of the gas is in the vapor phase. Another advantage of the invented apparatus is that it is immune to temperature or pressure changes and indicates accurately the total quantity of fluid within a container no matter what the ratio of the liquid phase to a gas phase within the closed container is. Another significant advantage of the present invention is that the elongated rod provided in the apparatus extends substantially the entire height of a container thereby being adapted to respond to all fluid levels within the container. This is in contrast to prior art devices wherein the weight does not extend the total height of the cylinder and therefore some percentage of weight change is not indicated by such an apparatus.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWINGS

FIGURE 1 is a simplified partially sectioned side view of the device installed in a fluid container.

FIGURE 2 is a partially sectioned front elevation of the invented device.

FIGURE 2A is a partially sectioned front elevation showing the rod in an empty container.

FIGURE 3 is a partially sectioned side elevation of an alternative embodiment of the invention.

FIGURE 4 is a section of the lower portion of the invented device.

FIGURE 5 is a simplified section of the magnetic readout device connected to the outlet valve.

FIGURE 5A is a simplified elevation of an alternative embodiment of the invented device.

FIGURE 6 is an exploded view of the magnetic readout device.

FIGURE 7 is a side view in diagrammatic form of an alternative form of the invention.

DESCRIPTION OF THE PREFERRED EMBODIMENT

The invented fluid quantity measuring device is based in principle upon the buoyant force exerted by fluid upon a submerged body. It is well known that the buoyant force exerted upon a body is equal to the weight of that amount of the fluid which a submerged body displaces and may be treated as a single force acting vertically upward through the center of gravity of the displaced fluid. Buoyancy exists in either a liquid or a gas. A body immersed in a gas is buoyed upward with a force equal to the weight of the gas displaced. If a rod of a known constant volume is submerged in a fluid having a liquid phase and a gas phase, the buoyant force exerted on the rod is a combination of the force exerted by the liquid and that exerted by the gas upon the portions of the rod submerged in each. If therefore a rod of constant cross-section is vertically disposed in a fluid container for substantially the entire height of the container from the bottom to the top, then the rod will respond to the buoyant force of the fluid for all fluid levels within the container. This reaction is temperature independent and is thus independent of changes in the liquid level due to temperature.

Referring now to FIGURE 1, there is shown a container 10 which is partially filled with a liquified gas and which has a liquid phase 12 and a gas phase 13 and an outlet valve 41 with an elongated rod 16 vertically disposed within the container. The rod is preferably hollow, but need not be. The liquid in the container can be (but need not be) under pressure and typically is a liquified gas under pressure.

With reference now to FIGURES 2, 2a, 4 and 5, an outlet valve 41 is attached to a fluid container 10 by means of threads 30. The outlet valve has a sleeve 32 providing an opening to the interior of container 10. Sleeve 32 supports a guide tube 16 which depends vertically from the outlet valve to a position proximate the bottom of container 10. In an alternative embodiment as shown in FIGURE 5a the guide tube 16 is suspended from a broadened neck section 31 which is in turn supported by hollow neck member 29 having openings 25a therein. Openings 25 are provided near the top of the guide tube above the liquid level which openings permit a gas phase within the container to pass through the holes and into the opening 32 of the outlet valve and through conduits 43 in the outlet valve. Proximate the top end and the bottom of the guide tube are guide members 28 and 23 which may conveniently be washers. These are adapted to prevent the oscillation of a weight 20 and a cable 18 coaxially inserted within the guide tube member by allowing the cable and elongated weight to pass through an opening therein. Members 28 and 23 can conveniently be made of a plastic material such as Teflon. Openings 24 are spaced along the length of guide tube member 16 so that fluid in container 10 can penetrate the guide tube, and can immerse rod 14. The guide tube 16 itself is of metal which is of thin gauge and which is strong enough to prevent a rod inserted into the guide tube from swinging or from moving in a lateral direction. In an alternative embodiment of the invention it is also possible to eliminate the guide tube and to have only a rod suspended from outlet valve sleeve 32.

An elongated cylindrical rod 14 is coaxially disposed within the guide tube 16. The rod comprises a hollow cylinder having a constant cross-section over substantially its entire length. However, an upper section of the hollow cylinder has an enlarged cross section 26. The enlarged cross section is to compensate for the fact that the rod does not extend for the entire height of the container but leaves a small space 27 for vertical movement as explained in more detail hereinafter. The lower portion of hollow cylinder 14 is adapted to fit within guide washer 23 in guide tube 14 and the upper section 26 is adapted to fit within the walls of guide tube 16. It is an important aspect of this invention that the rod member 14 when vertically disposed within guide tube 16 extends from proximate the bottom of container 10 to within a very small distance of the full mark within the container. This makes it possible for the weight to respond to all fluid levels within the container ranging from the full mark to completely empty. Since rod 14 must respond to buoyant forces by vertical movement, a small space 27 is left between the bottom of rod 14 and the bottom of the container. The vertical space 27 is adapted to accommodate all the vertical movement of rod 14 as it responds to the buoyant force of various fluid levels. After the rod is installed in an empty container and a fluid is introduced into the container, a buoyant force acting on the rod causes it to move vertically upwards. The enlarged cross section 26 of the rod is always in the gas phase. To compensate for the vertical distance 27 within which rod 14 does not extend and which therefore exerts no buoyant force, the cross-sectional area 26 proximate the top of rod 14 is made larger. This increased cross section compensates for the height deficiency of rod 14 and is therefore larger than the cross-section of the remainder of rod 14. In the preferred embodiment of the invention cylindrical rod 14 is made of stainless steel and is 5/8" in diameter. The rod is adapted to move vertically up and down for a distance of about an inch within guide tube 16 in response to variations in buoyant force on it which increase or decreases its weight. Thus, rod 14 does not act as a float but responds to weight variations by transmitting the force along cable 18 to spring 46 which is either compressed or released. When the buoyancy decreases the weight of the rod increases and spring 46 is compressed. In an alternative embodiment of the invention as shown in FIGURE 4, an additional mass 49 can be inserted into cylindrical rod 14, which as previously stated is hollow. Of course, the additional mass 49 need not be inserted therein; it is merely shown in FIGURE 4 to indicate how it might be inserted if desired. This serves the purpose of reducing the amount of vertical motion of the rod in response to buoyant forces.

Rod 14 is suspended within guide tube 16 by a biasing means cable 18 which passes through a vertical opening along the longitudinal axis of rod 14. The biasing means could also be a thin rod. At the bottom of the hollow cylindrical rod 14 is a plug 20 through which the cable passes. The cable is held within the plug by a set screw 22. It is, of course, within the scope of the invention to use other means to secure cable 18 to weight 14 such for example as a bushing or a permanent fixture without a set screw. Cable 18 passes through weight 14 and through sleeve 32 through conduit 36 best shown in FIGURES 2 and 5 and attaches to permanent magnet 42. Cable 18 transmit a weight change of cylindrical rod 14 due to buoyancy forces acting thereon to the permanent magnet 42. As the weight on cable 18 is increased (due to less fluid in the cylinder and therefore less buoyancy of rod 14) the magnet 42 responds by moving downwardly thereby compressing spring 46. If buoyancy is increased the magnet 42 is urged upwardly by spring 46 (FIGURE 5). Cable 18 is made of stainless steel wire of approximately .032 diameter, but can of course be made of a variety of other materials having various dimensions.

With reference now specifically to FIGURES 5 and 6, the indicating means 38 comprises a permanent magnet 42 to the underside of which is attached cable 18. A magnet return spring 46 is located longitudinally with respect to the cable which passes through the center of the spring coils. Spring 46 is situated with its upper end in contact with permanent magnet 42, and its lower end in contact with plug 50. Thus, when magnet 42 is forced downwardly by cable 18, spring 46 resists that force, is compressed, and tends to urge the magnet upwardly. When cable 18 no longer applies a force to magnet 42, spring 46 urges the magnet upwardly. Return spring 46 can alternatively be placed with one end attached to sleeve 16 and the other end attached to rod 14 such that in an empty container the weight of rod 14 is exactly counterbalanced by the tension in spring 46. When a fluid is introduced into the container the buoyancy of the rod increases hence its weight decreases and the spring 46 urges the rod upwardly for a previously calibrated distance. This movement is transmitted to an indicating means such as member 38. In either mode of the invention spring 46 is calibrated so that the various weight changes of rod 14 cause the spring to move a known distance. These distances can then be correlated to graduations inscribed on the cover 55 of indicating device 38. A shock spring 48 is longitudinally located around retainer 44 and between the retainer 44 and cover 55. It is the function of spring 48 to keep indicating ring 40 from dropping out of the magnetic field of magnet 42 when subjected to severe shock sufficient to snap it out of the magnetic field.

A ring of magnetic material 40 serves as an indicator band and is adapted to pass circumferentially over the retainer 44 and to slide in a vertical direction over the retainer. The indicator band is situated coaxially with permanent magnet 42. Proximate the lower end of the indicating device 38 situated coaxially with cable 18, is a plug 50, which allows cable 18 to slide therethrough and which fits into the lower end of retainer 44. A transparent cover 55 is adapted to sheath the entire indicator assembly.

The transparent cover has graduations 54 on it which indicate the various amounts of fluid (by weight) in a container. The graduations are placed on cover 55 by calibrating with various weights of liquid (or if a pressurized container various amounts of fluid) in the cylinder. When assembled, the magnetic indicator is attached to outlet valve 41 by threading 52. In the presently preferred embodiment of the invention a reed switch 60 is situated proximate magnetic indicating device 38 at a predetermined level. When the permanent magnet passes close to the reed switch a circuit is closed and a warning device 62 is activated. It is thereby possible to monitor the fluid quantities in the container. When cable 18 is tensioned and exerts a downwardly force on permanent magnet 42, the permanent magnet overcomes the upward urge of magnet return spring 46 and moves downward inside the retainer. The magnetic material indicator band 40 which can be made of a magnetic material such as steel then, by magnetic attraction, follows the permanent magnet 42 downwardly to a point at which the downward force on cable 18 is just offset by the compressive force of spring 46. At this point the indicator band will stop opposite a graduation on cover 55. Since cover 55 has been previously calibrated, it is then possible to read the weight of fluid in the container by noting the indicated graduation. As the amount of fluid in the container increases, the buoyant force on weight 14 increases and reduces the weight on cable 18. This in turn allows magnet return spring 46 to urge the permanent magnet upwardly towards the top of retainer 44. Again, magnetic material indicator band 40 follows the permanent magnet and stops when equilibrium is achieved between weight 14 and magnet return spring 46. It is now a simple matter to read the graduations on cover 55.

The operation of magnetic indicating means 38 in cooperation with cable 18 does not impede the operation of outlet valve 41 from its normal functions, that is of withdrawing gas from a cylinder.

In an alternate embodiment to measure fluid in an open container no outlet valve is necessary and the rod can be suspended into a container by means of a cable which is then connected to an indicating means. In this embodiment the same principle of buoyancy and slight vertical movement of the rod apply. It is, of course, within the scope of the invention to provide calibrated indicated means other than magnetic such, for example, as a calibrated spring operated dial and so on.

With reference to FIGURE 7, there is shown an alternate embodiment of the invention wherein the rod 14 and guide tube 16 are vertically imposed within a gasoline tank 10 and wherein a hydraulic line 21 is attached to the magnetic indicator band 73 which is situated on an auto instrument panel. A diaphragm 17 is positioned on tank 10 such that it responds to pressure applied by rod 14 (which is in effect an upward or downward movement of rod 14 caused by an increase or decrease in buoyancy). A hydraulic fluid 19 in the diaphram is forced along line 21 by a positive pressure exerted on diaphram 17 by rod 14. A pressure gauge 9 can also be connected to line 21. The fluid 19 then causes an indicator 73 to respond and to indicate fluid level in tank 10. As fluid in tank 10 is used, rod 14 drops lower and pressure on diaphram 17 is lessened thereby allowing hydraulic fluid 19 to recede into its reservoir. The indicator 73 then responds to the lower fluid pressure.

In operation, a rod 14 of constant cross section is vertically imposed within a container in which the liquid is to be measured. A cable is attached to the weight and is also attached at its other end to a magnetic indicating means 38. As the liquid level in the container drops because liquid is being used up, the buoyant force on the immersed weight is decreased and the effective weight of weight 20 increases thereby putting additional tension on cable 18 which in turn causes permanent magnet 42 to move downwardly and to overcome the upwardly urging spring 46. At equilibrium the indicator band 40 which follows permanent magnet 42 indicates the liquid level within a container. During this operation, weight 20 moves up and down vertically within guide member 16 and without touching the sides thereof. To compensate for space 27 within the container allowing for vertical movement of the weight, the cross section of the rod is correspondingly increased near the upper end thereof. This is accomplished by calculating the displacement of a one inch length of the rod and by adding the volume to the upper end of the rod by increasing its diameter appropriately. This added displacement value must always be at top part of weight where it will always be measuring a vapor gas only. Thus, rod 14 is fully responsive to all fluid levels within the container. When the liquid level within the container has dropped sufficiently so that there is a substantial gas phase, rod 14 is of course also responsive to the buoyant force exerted by the gas displaced by the rod. Thus, the total buoyant force applied to rod 14 is a combination of the buoyant force of the liquid phase and of the gas phase. Therefore, it is possible to accurately measure the total amount of liquified gas and the gas phase within the container and therefore of the total weight of available gas within the container. Since rod 14 does not act as a float by following only the liquid level, but is responsive to weight changes due to an increase or decrease in the buoyant force, the vertical movement of weight 14 is necessarily very limited. Thus, a much greater accuracy is achieved than is true of a float mechanism.

To illustrate the manner in which the invented device can function the following example is given. In a carbon dioxide tank having a total inside capacity of 1,000 cubic inches of space, containing 20 lbs. or 320 ounces of liquid $CO_2$, there is vertically disposed a rod measuring 1 inch square and 20 inches long and weighing 10 ounces. The length of the rod is 1 inch shorter than the full length of the cylinder. But the top part of the weight is larger in cross-section to compensate for this loss in length. If it is stipulated that when half-filled the tank contains 20 lbs. of $CO_2$, then there are 320 ounces of liquid $CO_2$ contained in 500 cubic inches. Thus, the liquid $CO_2$ has a density of 320 ounces divided by 500 cubic inches; this equals 0.64 ounce per cubic inch. Since the length of the rod (20 inches) extends from the bottom of the tank to the top of the tank, the rod would be submerged to a depth of 10 inches in liquid $CO_2$. The buoyant lift on the rod is then $10 \times .64$ ounce (this is the cubic inches of $CO_2$ displaced times weight of $CO_2$ per cubic inch) or 6.40 ounces of buoyant lift. Since this rod as stated before weighs 10 ounces in an empty cylinder, when the tank is half-full of liquid $CO_2$ the rod weighs 10 ounces minus 6.40 ounces which equals 3.60 ounces. A weight of 3.60 ounces transmitted along the cable allows the spring in the magnetic indicator to urge the permanent magnet upwardly (because the spring has a compressive force greater than 3.60 ounces) and to cause the indicator band to a graduated point on the cover.

At this point the top 10 inches of the rod does not have any buoyant lift effect. As the liquid $CO_2$ warms up to room temperature, ½ the liquid boils off into a vapor phase, the liquid level is decreased to only 5 inches in depth. Now the vapor phase occupies 750 cubic inches of space and the liquid phase occupies 250 cubic inches and there is a total volume of 1,000 cu. in. in which to displace. The density of the vapor space has been raised from zero per cu. in. to 250 cu. in. $\div 750 = .333$ cu. in. of $CO_2$ vapor per cubic inch within the tank. There are now 5 inches of the rod immersed in liquid $CO_2$ which gives a buoyancy lift of $5 \times .640 = 3.20$ ounces of lift in liquid $CO_2$. There are now 15 inches of the rod immersed in a vapor phase having a density of .333 cu. in. of $CO_2$ per cubic inch $\times .640$ ounce per cu. in. = a weight of .2131 ounce = 3.1965 ounces of buoyant lift exerted on the rod by the vapor phase. Adding buoyant lift of the liquid phase to the buoyant lift of the vapor phase there is $3.1965 + 3.2000 = 6.3965$ ounces. Although this figure is not precisely the same as that for all liquid $CO_2$ the difference is due to not carrying out the decimal point far enough in the calculations.

It is apparent from the foregoing that the invented fluid measuring device has many advantages. One of these advantages is that it is possible to accurately determine the amount by weight of all available fluid within a pressurized cylinder. Another advantage is that since this device does not operate on the float principle that only a small vertical movement of the weight is required and this can be precisely transmitted to a magnetic indicator. Another advantage of the invented device is that in contrast to prior art devices the weight employed is substantially the same height as the entire container. Thus, the weight is responsive to the liquid level change at any level within the container and the weight is also adapted to respond to the buoyant forces of both a liquid phase and a gas phase.

Although this invention has been disclosed and illustrated with reference to particular applications, the principles involved are susceptible of numerous other applications which will be apparent to persons skilled in the art.

What is claimed is:

1. In a container having therein a quantity of fluid, a fluid quantity measuring device comprising:
    a fluid quantity read-out device coupled to a container;
    elongated means vertically disposed within said container extending substantially the entire height of said container and having an enlarged cross section proximate the upper end thereof for reproducibly responding to the bouyant force of a fluid within said container at all quantities of said fluid, the enlarged cross-section being of a size to compensate for the fact that the elongated means does not extend completely to the top of the container; and
    means connected to said elongated means and connected to said read-out device for transmitting changes in position of said elongated means due to bouyancy forces of said fluid in said container to said indicating means.

2. The device as defined in claim 1, and further comprising an outlet valve connected to said container and providing an opening into said container, a guide tube depending vertically into said container from the opening of said outlet valve, and said elongated means being disposed coaxially within said guide tube.

3. The device as defined in claim 1, said read-out device comprising a fluid quantity indicating means, a reed switch operatively connected to said fluid indicating means and to a signal device, said reed switch being adapted to actuate said signal device at a predetermined level of fluid.

4. The device as defined in claim 1, wherein said last mentioned means comprises a cable.

5. The device as defined in claim 4 wherein said fluid quantity read-out device comprises:
    a graduated housing;
    a permanent magnet disposed within said housing and operatively connected to said cable;
    a magnetic material indicating band, said band being adapted to follow the movements of said permanent magnet; and,
    a magnet return spring.

References Cited

UNITED STATES PATENTS

| | | | |
|---|---|---|---|
| 2,653,478 | 9/1953 | Harper | 73—309 |
| 2,576,561 | 11/1951 | Binford. | |
| 706,505 | 8/1902 | Washington | 73—309 |
| 1,516,160 | 11/1924 | Springer | 73—309 |
| 1,590,287 | 6/1926 | De Giers | 73—309 |
| 2,069,959 | 2/1937 | Kuljian | 73—309 |
| 2,634,608 | 4/1953 | Sorber | 73—290.1 |
| 2,797,577 | 7/1957 | Wilhelm | 73—318 |
| 2,820,865 | 1/1958 | McKinnies. | |
| 3,204,230 | 8/1965 | Hosford. | |
| 3,279,254 | 10/1966 | Zumbusch | 73—309 |

FOREIGN PATENTS

| | | |
|---|---|---|
| 533,737 | 12/1921 | France. |
| 1,186,087 | 1/1965 | Germany. |
| 10,992 | 8/1905 | Great Britain. |

LOUIS R. PRINCE, Primary Examiner

DANIEL M. YASICH, Assistant Examiner

U.S. Cl. X.R.

73—309; 200—84